United States Patent Office 3,151,949

Patented Oct. 6, 1964

3,151,949

MANUFACTURE OF SEMICONDUCTOR RECTIFIER

Heinz-Günther Plust, Wettingen, Aargau, and Erich Weisshaar, Neuenhof, Aargau, Switzerland, assignors to Aktiengesellschaft Brown, Boveri & Cie, Baden, Switzerland, a joint-stock company No Drawing. Filed Oct. 3, 1960, Ser. No. 59,813

4 Claims. (Cl. 29—195)

This invention relates to an improvement in the manufacture of rectifiers of the semiconductor type according to the so-called alloying technique, and is a continuation-in-part of our application Serial No. 843,045, filed September 29, 1959, and abandoned on October 6, 1960. According to that general method, a suitable alloying substance which contains, or represents itself as, an "impurity" of the required type for creating a "p" region or an "n" region within the body of the semiconductor material, is applied to the surface of the latter and then thermally treated so as to cause the alloying material to become alloyed with the semiconductor.

Incorporation, by alloying, of foreign atoms of such elements as phosphorus, arsenic and antimony (these are called donors) into the body of the semiconductor material serve to establish a corresponding "n" region therein. Incorporation of foreign atoms of such elements as aluminum, indium, gallium and boron (these are called acceptors) serve to establish a corresponding "p" region in the body of the semiconductor material. The "p" and "n" regions established within the semiconductor body by such alloying technique are separated from each other by a boundary layer which is known as a "p–n junction." This modified composite semiconductor body is now capable of passing current readily in one direction through the "p" and "n" regions while blocking current in the opposite direction and hence is commonly known as a "semiconductor rectifier."

If a satisfactory p–n transition is to be established within the body of the semiconductor, the solubility of the semiconductor material, for example, germanium, silicon, silicon carbide, or so-called III–V compounds, like gallium arsenide, etc., in the alloying material, for example, indium, lead, tin etc., must not be too low, so that semiconductor material passes over to a sufficient extent into the alloying material. The semiconductor material, which dissolves in the alloying material during the thermal treatment phase, re-crystallizes partly upon cooling at the alloying front, after the alloying is completed. The re-crystallized substance now consists no longer of pure semiconductor material but is rather a combination of such material with the alloying material, or also of a solid solution of this material. These substances have a thermal expansion coefficient which differs from that of the pure semiconductor material itself. Consequently, there is the danger that so-called "cracks" will appear when the semiconductor rectifier is heated, i.e. severe mechanical damages occur within the semiconductor body.

It is known to prevent the appearance of these damages by providing the alloying material, on the side facing away from the semiconductor body, with an electrode whose thermal coefficient of expansion is equal to that of the semiconductor material and/or by applying the alloying material only in a very thin coating. Apart from the fact that these measures solve the problem only incompletely, because they do not act upon the actual causative factor, they complicate the manufacturing process of the rectifier.

A logical measure for preventing the appearance of the foregoing explained damage consists in selecting an alloying material which practically does not form a compound or a solid solution with the semiconductor material. Any possibility of the above described damage occurring is thus eliminated because the recrystallized substance consists of pure semiconductor material. The applicability of this damage preventive expedient is, however, hindered by the fact that the solubility of the semiconductor material in these special alloying materials is very low at the alloying temperature. Consequently, no satisfactory p–n transition is obtained when these materials are used, i.e. the electric properties of the rectifiers are unsatisfactory.

The object of the present invention is to eliminate the foregoing disadvantages and the inventive concept is predicated upon the discovery that a sufficient amount of semiconductor material must pass over into the alloying material to ensure a satisfactory "wetting," if a satisfactory p–n conduction characteristic is to be obtained, but that it is immaterial whether the semiconductor material is actually dissolved in the alloying material, or whether it is linked elsewhere. According to the invention, an alloying material is used which practically does not form a compound in its solid phase with the semiconductor material and no solution either, and that an alloying addition is added to the alloying material, such additional alloying constituent being a material which combines with the semiconductor material at the alloying temperature to form a compound that is insoluble in the alloying material. When this improved method is used, the following processes take place.

Corresponding to the low solubility of the semiconductor material, a small amount of the semiconductor material is at first dissolved. This combines, however, soon with the alloying material, that is, it disappears from the solvent and permits therefore the passage of additional semiconductor material. In the stationary state, there is thus a saturated solution of semiconductor material in the alloying material, and an amount, corresponding to the amount of semiconductor material passing over, combines with the alloying additive to form a substance that is insoluble in the alloying material. On cooling, after the alloying process is completed, a substance recrystallizes from the material dissolved in the alloying material which consists practically of pure semiconductor material and which can thus not represent a cause for the above described damages. The rest of the semiconductor material that has passed over remains linked to the alloying additive.

As an example, we mention the application of the process according to the invention in the manufacture of rectifiers with silicon as a semiconductor material. Materials which practically form no compound and no solution in their solid phase with the silicon are, for example, lead and tin, as well as alloys of all proportions of these metals, to which gold can be added in a portion of up to 40%. Alloying materials of these metals have the additional advantage that the contacting, to be effected later in the manufacturing process, can be carried out easily. In addition to the "impurities" to be provided by the alloying material in known manner (for example, antimony, aluminum, indium, gallium, or arsenic etc.) to establish the "n" and "p" regions within the silicon body, an alloying additive is added to the alloying material which can consist of tungsten, molybdenum, niobium, or tantalum. At the alloying temperature (800 to 1000° C.), all these metals form a compound with silicon which is insoluble in lead, tin or their alloys etc. The intended effect can be obtained on a correspondingly small scale with any low portion of the alloying addition. An upper limit for this portion, which is about 20% for molybdenum, according to practical experiences, is given by the fact that, with a higher portion, too little semiconductor material remains dissolved so that too little semiconductor material recrystallizes on cooling, after the alloying process is completed.

A preferred variant of the process is characterized by an alloying additive of molybdenum in an amount of 5%. The molybdenum must be added to the alloying material in active form, for example, in sponge form. A suitable form can be obtained from $(NH_4)_2MoO_4$, by decomposing the latter to $MoO_3$ and reducing it subsequently with hydrogen in two steps over $MoO_2$ to Mo.

A specific example of the improved semiconductor rectifier and the method for making it is as follows:

A disc consisting of silicon is cut to a thickness of 0.02" which is then lapped and etched in a conventional manner to a thickness of 0.01". An alloy according to the invention which is composed of 64% lead and 30% gold as alloying material, 1% of antimony as active impurity of the donor type and 5% molybdenum in powder form as alloying additive, is placed on the silicon disc in the form of a disc or sphere. The alloying in of both parts is then performed under argon as a protective gas at a temperature of 800° C. After three minutes, it is gradually cooled at a rate of 15° C. per minute.

In general the alloying material may consist of lead or tin in proportion of less than 99% but more than 79%, antimony about 1% and molybdenum in proportion of more than ½% but less than 20%. When gold is added as described above the proportions may be as follows: lead or tin less than 98% but more than 39%, gold more than 1% but less than 40%, antimony about 1% and molybdenum more than ½% but less than 20%. A specific composition within said ranges is lead 64%, gold 30%, antimony 1% and molybdenum 5%.

The semiconductors produced according to the process of the invention are characterized by complete thermal and mechanical stability. Advantageous is also the fact that the inclusions from the alloying additive and its combination with the semiconductor material, contained in the alloying material, prevent a too regular crystallization of the alloying material on cooling, after the alloying process is completed. Consequently, the mechanical strength of the alloying material in the finished rectifier is not very high, that is, this material remains so flexible that no damages can be caused in spite of different coefficients of thermal expansion of semiconductor material and alloying material.

We claim:

1. A semiconductor device comprising a body of semiconductive silicon of p-conductivity type having a recrystallized region on one surface of said body, said recrystallized region being of n-conductivity type, and an electrode contiguous with said recrystallized region which consists of a first metal selected from the group consisting of lead and tin and allows thereof with each other and with gold in the proportion of less than 98% and more than 79% and a second metal of antimony in the proportion of approximately 1% in solid solution in said first metal and the insoluble silicide of molybdenum, said molybdenum being in the proportion of more than ½% and less than 20% and said silicide being present in said first metal.

2. A semiconductor device comprising a body of semiconductive silicon of p-conductivity type having a recrystallized region on one surface of said body, said recrystallized region being of n-conductivity type, and an electrode contiguous with said recrystallized region which consists of a first metal of lead-gold allow in the proportion of less than 98% and more than 39% lead, and more than 1% and less than 40% gold, a second metal of antimony in the proportion of approximately 1% in solid solution in said first metal, and the insoluble silicide of molybdenum, said molybdenum being in the proportion of more than ½% and less than 20% and said silicide being present in said first metal.

3. A semiconductor device comprising a body of semiconductive silicon of p-conductivity type having a recrystallized region on one surface of said body, said recrystallized region being of n-conductivity type, and an electrode contiguous with said recrystallized region which consists of a first metal of tin-gold-alloy in the proportion of less than 98% and more than 39% tin, and more than 1% and less than 40% gold, a second metal of antimony in the proportion of approximately 1% in solid solution in said first metal, and the insoluble silicide of molybdenum, said molybdenum being in the proportion of more than ½% and less than 20% and said silicide being present in said first metal.

4. A semiconductor device comprising a body of semiconductive silicon of p-conductivity type having a recrystallized region on one surface of said body, said recrystallized region being of n-conductivity type, and an electrode contiguous with said recrystallized region which consists of a first metal of lead-gold alloy in the proportion of 64% lead and 30% gold, a second metal of antimony in the proportion of 1% in solid solution in said first metal, and the insoluble silicide of molybdenum, said molybdenum being in the proportion of 5% and said silicide being present in said first metal.

References Cited in the file of this patent

UNITED STATES PATENTS

| | | |
|---|---|---|
| 2,530,110 | Woodyard | Nov. 14, 1950 |
| 2,742,383 | Barnes et al. | Apr. 17, 1956 |
| 2,813,233 | Shockley | Nov. 12, 1957 |
| 2,845,373 | Nelson | July 29, 1958 |
| 2,854,612 | Zaratkiewicz | Sept. 30, 1958 |
| 2,960,419 | Emeis | Nov. 15, 1960 |
| 2,960,640 | Emeis | Nov. 15, 1960 |
| 2,977,262 | Carlson et al. | Mar. 28, 1961 |